United States Patent [19]

Chung et al.

[11] Patent Number: 5,208,298
[45] Date of Patent: May 4, 1993

[54] STABLE SOLUTION OF POLYBENZIMIDAZOLE AND POLYSULFONS BLENDS

[75] Inventors: Tai-Shung Chung, Randolph; Arthur G. Schlask, Roselle Park; Dieter Kurschus, Bayville, all of N.J.

[73] Assignee: Hoechst Celanese Corp., Somerville, N.J.

[21] Appl. No.: 865,386

[22] Filed: Apr. 8, 1992

[51] Int. Cl.$^5$ .................. C08L 77/06; C08L 81/06; C08L 79/04
[52] U.S. Cl. ........................... 525/435; 524/606; 524/609; 524/612; 525/540; 525/906
[58] Field of Search .............. 524/606, 609, 612, 720; 525/435, 540, 906

[56] References Cited

U.S. PATENT DOCUMENTS 3,441,640  4/1969  Santangelo .................. 524/422
4,340,697  7/1982  Aya et al. ................... 525/906

FOREIGN PATENT DOCUMENTS 0240302  10/1987  European Pat. Off. .
91/04300   4/1991  PCT Int'l Appl. .

Primary Examiner—Paul R. Michl
Assistant Examiner—Tae H. Yoon
Attorney, Agent, or Firm—J. M. Hunter, Jr.

[57] ABSTRACT

A stable solution of polybenzimidazole resin containing from approximately 10 to approximately 35 weight percent of resins and from approximately 65 to approximately 90 weight percent of a suitable solvent, the resins consist of from approximately 70 to approximately 95 weight percent of polybenzimidazole and from approximately 5 to approximately 30 weight percent of polysulfone, wherein the solution is substantially free of organic salt. The solution is useful for the production of films, fibers and molded articles exhibiting enhanced mechanical properties.

20 Claims, 4 Drawing Sheets

STABLE SOLUTION OF POLYBENZIMIDAZOLE AND POLYSULFONS BLENDS

FIELD OF THE INVENTION

The present invention relates to a stable solution of aromatic polybenzimidazole and polysulfone resins which is substantially free of organic salts. The solution is useful for the production of films, fibers and molded articles.

BACKGROUND ART

Aromatic polybenzimidazoles are a unique class of intractable, i.e., not melt processable, organic polymers which are high temperature resistant, as well as chemical and oxidative resistant. Because these polymers are not melt processable, it is difficult to form them into film, fibers and molded articles. To enhance the melt processability, reduce the cost of products made therefrom, and moisture takeup of the finished product, polybenzimidazole is often blended with a tractable polymer. One useful tractable polymers useful for blending with polybenzimidazole is aromatic polysulfones. However, desirable mechanical and thermal properties are significantly reduced by the addition of these melt processable polymers; the degree of reduction is usually proportional to the weight percent of the melt processable polymer addition. Blends of polybenzimidazole and polysulfone are generally prepared by a process known as solution blending. Solution blending involves dissolving both polymers in a suitable solvent to form a polybenzimidazole-containing dope. The dope can be utilized to form films or fibers by conventional techniques, or the resins blend can be precipitated out of solution utilizing a non-solvent. The precipitate can be dried to form a particulate blend which is useful for forming molded articles and the like.

When solution of polybenzimidazole and polysulfone in the range of from approximately 1 to approximately 99 weight percent of polybenzimidazole and approximately 1 to approximately 99 weight percent of polysulfone are dissolved in a suitable solvent, the polybenzimidazole will separate out of the solution after a short period of time unless it is stabilized with an organic salt, e.g., lithium chloride. While the addition of a stabilizer has lengthened the time of solution stability, it has resulted in the adverse effecting the mechanical and thermal properties of fibers spun from the dope. It has now been discovered that solutions of polybenzimidazole and polysulfone within the range of approximately 10 to approximately 35 weight percent of polysulfone and approximately 65 to approximately 90 weight percent of polybenzimidazole which are substantially free of organic salts are stable for long periods of time without phase separation. Fibers produced from the solution exhibit enhanced mechanical and thermal properties.

SUMMARY OF THE INVENTION

The present invention is directed to a stable solution of polybenzimidazole resin consisting of from approximately 10 to approximately 35 weight percent of resin and from approximately 65 to approximately 90 weight percent of a suitable solvent, based on the total weight of the solution, the resin component consisting of from approximately 70 to approximately 95 weight percent of polybenzimidazole (PBI) and from approximately 5 to approximately 30 weight percent of polysulfone (PS), based on the total weight of the resins present in the solution, wherein the solution is substantially free of organic salt.

Another embodiment of the invention is directed to a fiber prepared from a stable solution of polybenzimidazole resin solution consisting of from approximately 10 to approximately 35 weight percent of the resin and from approximately 65 to approximately 90 weight percent of a suitable solvent, based on the total weight of the solution, the resin component consisting essentially of from approximately 70 to approximately 95 weight percent of polybenzimidazole resin and from approximately 5 to approximately 30 weight percent of polysulfone resin, based on the total weight of the resins, wherein the resins solution is substantially free of organic salts, by the process of:

(a) preparing a stable solution of polybenzimidazole resin consisting of from approximately 10 to approximately 35 weight percent of resin and from approximately 65 to approximately 90 weight percent of a suitable solvent, based on the total weight of the solution, the resin consisting of from approximately 70 to approximately 95 weight percent of polybenzimidazole and from approximately 5 to approximately 30 weight percent of polysulfone, based on the total weight of the resins present in the solution, wherein the solution is substantially free of organic salts;

(b) fabricating a fiber from the solution under substantially moisture-free conditions;

(c) evaporating the solvent from the fiber;

(d) washing the fiber with a non-solvent; and (e) drying the fiber at a low temperature The resins solution is stable for long periods of time, and fibers produced from the solution exhibit enhanced mechanical and thermal properties which make them useful as flame retardant materials.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which:

DETAILED DESCRIPTION OF THE INVENTION

Figure 1:
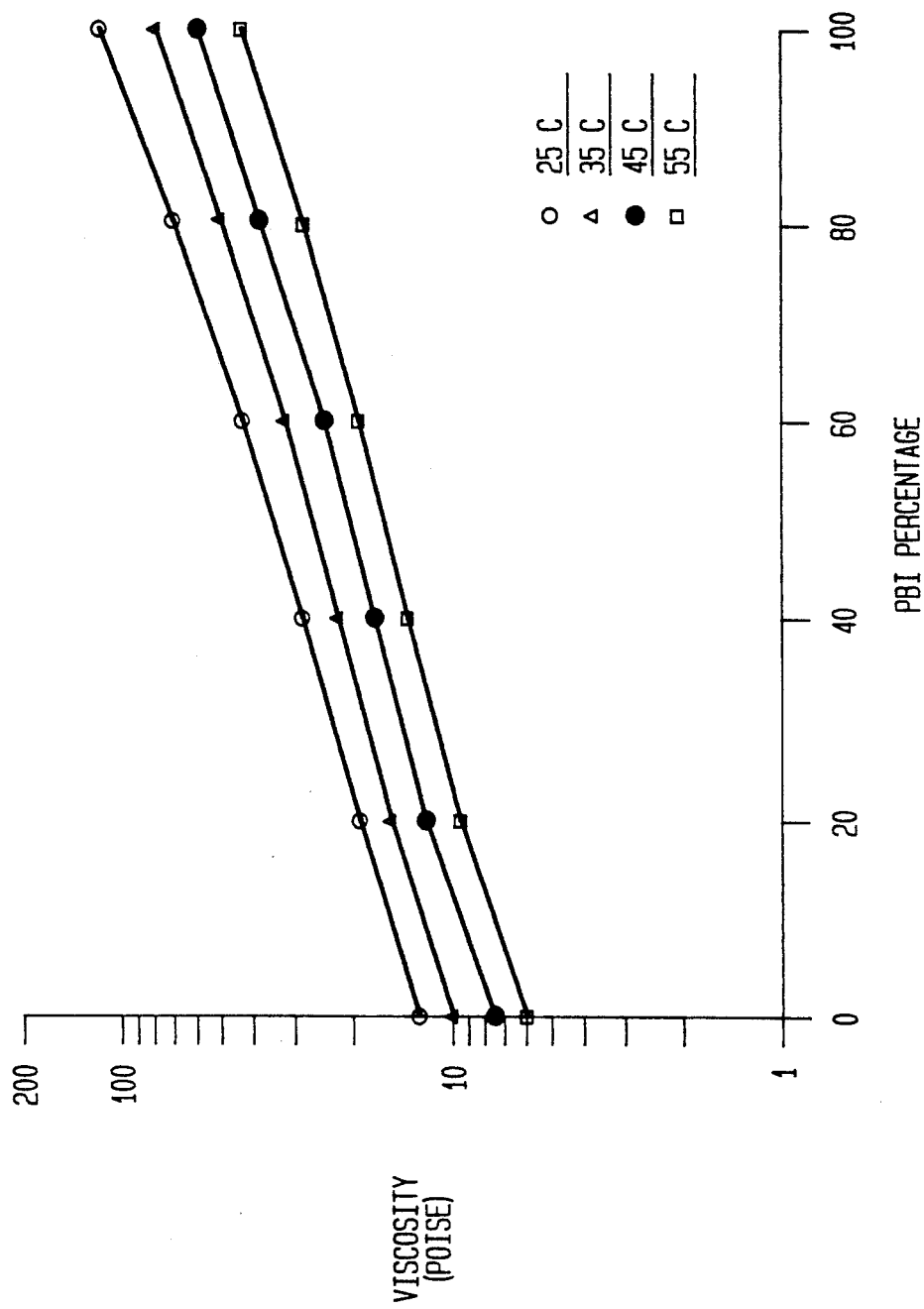
FIG. 1 is a graph of the viscosities of various weight ratios of stable solutions containing 21 weight percent of polybenzimidazole and polysulfone resins dissolved in N,N'-dimethylacetamide solutions.

Generally, the aromatic polybenzimidazole useful in the present invention may be any polybenzimidazole resins known to those skilled in the art. Typical polymers of this class and their preparation are more fully described in U.S. Pat. No. 2,895,946; U.S. Pat. No. 26,065; and the Journal of Polymer Science, Vol. 50, pages 511-539 (1961), which are herein incorporated by reference in their entirety. These polybenzimidazoles consist essentially of recurring units of the Formulae I and II:

Formula I is:

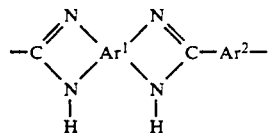

wherein Ar$^1$ represents a tetravalent aromatic moiety having the formula:

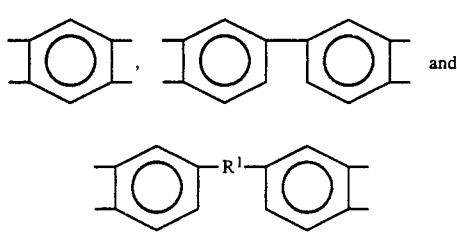

wherein R$^1$ is O, SO$_2$, CH=CH, C(CF$_3$)$_2$ or (CH$_2$)$_x$ and wherein x is an integer of from 1 to 4; and Ar$^2$ represents a divalent aromatic moiety having the formula:

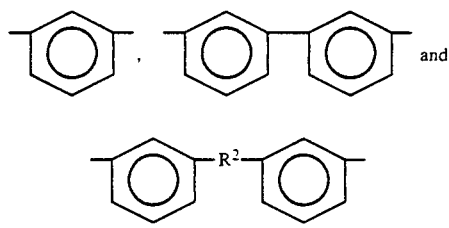

wherein R$^2$ is O, SO$_2$, CH=CH, C(CF$_3$)$_2$ or (CH$_2$)$_x$ and wherein x is an integer of from 1 to 4.

Formula II is:

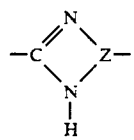

wherein Z is an aromatic nucleus having the nitrogen atoms forming the benzimidazole ring paired upon adjacent carbon atoms of the aromatic nucleus.

Examples of typical polybenzimidazoles which may be used in the present invention are as follows:
poly-2,2'-(m-phenylene)-5,5'-bibenzimidazole;
poly-2,2'-(pyridylene-3'',5'')-5,5'-bibenzimidazole;
poly-2,2'-(furylene 2'',5'')-5,5'-bibenzimidazole;
poly-2,2'-(naphthalene 1'',6'')-5,5'-bibenzimidazole;
poly-2,2'-(biphenylene-4'',4'')-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-cyclohexeneyl-5,5'-bibenzimidazole;
poly-2,2'-(m-phenylene)-5,5'-di(benzimidazole) ether;
poly 2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2''-(m phenylene)-5',5''-di(benzimidazole) propane-2,2; and
poly-2',2''-(m-phenylene)-5,5''-di(benzimidazole) ethylene-1,2;
where the double bonds of the ethylene groups are intact in the final polymer.

A preferred polybenzirpidazole for use in the present invention is poly-2,2'-(m-phenylene)-5,5'-bibenzimidazole, the recurring unit of which is:

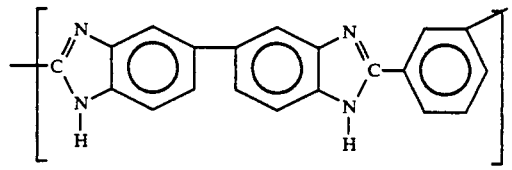

Processes for preparing the aromatic polybenzimidazoles of the invention are described in U.S. Pat. Nos. 3,441,640; 3,433,772; 3,509,108; 3,549,603; 3,526,693; 3,552,389; 3,619,453; 3,671,491; 3,969,430; and 4,020,142 all of which are herein incorporated by reference in their entirety.

The addition of a minor amount of polysulfone to polybenzimidazole can decrease moisture takeup, reduce the process temperature, increase the tractability, and reduce the cost of polybenzimidazole products.

Generally, the polysulfones of the present invention and their method of preparation are well known in the art; see, for example, U.S. Pat. Nos. 3,709,841 and 4,273,903 both of which are herein incorporated by reference in their entirety. The preparation of a polymer in which part of the aromatic rings are substituted with hydroxysulfonyl radicals (SO$_3$H), known as sulfonic groups); other references are U.S. Pat. No. 4,273,903 and United Kingdom Pat. No. 1,350,342.

The polysulfone contains recurring units of the formula:

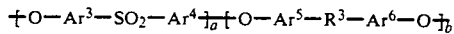

wherein Ar$^3$, Ar$^4$, Ar$^5$, and Ar$^6$ are aromatic moieties having from approximately 6 to approximately 18 carbon atoms, or aromatic moieties having the following formula:

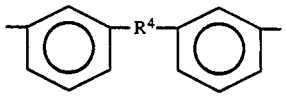

wherein R$^4$ represents C(CH$_3$), SO$_2$, S, O, or mixtures thereof; R$^3$ represents a divalent aliphatic moiety containing up to 6 carbon atoms, or mixtures thereof; and a has the value greater than approximately 0.5 to approximately 1.0, b has the value of 0 or less than approximately 0.5, and the sum of a and b is equal to 1.0. In the preferred polysulfones, the number of sulfone linking groups relative to all others is typically 1 out of 3. These relative inexpensive polymers exhibit good physical properties, e.g., thermal resistance, impact strength, etc., and are readily blendable with polybenzimidazole.

The polysulfones from Amoco Corporation, known by the registered names of Udel ®P1700, Radel-®A400, and Victrex PES ®4100G from ICC are the most preferred. Udel ®P1700 is believed to be prepared from a nucleophilic substitution reaction between a sodium salt of a bispheol A and 4,4'-dichlorodiphenylsulfone. These polysulfones are amorphous polymers; a combination of polysulfones may be blended in the compositions of the invention.

The invention is directed to a stable solution containing from approximately 10 to approximately 35 weight percent of resin, i.e., polymer solids, and from approximately 65 to approximately 90 weight perent of a suitable solvent, based on the total weight of the solution, wherein the solution is substantially free of organic salt. Typically, the solution contains approximately 20 to approximately 30 percent by weight of resin and from approximately 70 to approximately 80 weight percent of solvent, and preferably, the solution contains approximately 28 weight percent of resin and approximately 72 weight percent of solvent, based on the total weight of the solution, wherein the solution is substantially free of organic salt.

It has been discovered that if the dope is to be miscibly stable without the addition of an organic salt stabilizer such as lithium chloride, the ratio of polybenzimidazole to polysulfone must be maintained within certain range limits. Generally, the resin solution contains from approximately 70 to approximately 95 weight percent of polybenzimidazole and from approximately 5 to approximately 30 weight percent of polysulfone, based on the total weight of resins present in the solution. Typically, the solution contains from approximately 75 to approximately 85 weight percent of polybenzimidazole and approximately 15 to approximately 25 weight percent of polysulfone, based on the total weight of resins present, and preferably, the resin solution contains approximately 80 weight percent of polybenzimidazole and approximately 20 weight percent of polysulfone, based on the total weight of resins present in the solution; it has been discovered that these preferred weight percents are stable at ambient conditions for at least two month under stagnant conditions.

The polymeric solutions of the present invention are prepared by dissolving an aromatic polybenzimidazole and a polysulfone in a suitable solvent. While any substance that will dissolve both polybenzimidazole and polysulfone is suitable for forming the solution of the invention, generally, known useful solvents may be selected from N,N'-dimethylacetmaide, N,N'-dimethylformamide, dimethylsulfoxide, and N-methyl-2-pyrrolidone, formic acid, acetic acid, sulfuric acid, polyphosphoric acid, and methanesulfonci acid. Particularly, the preferred solvent is N,N'-dimethylacetamide (DMAc) having a concentration of from approximatley 90 to approximately 100 percent, and preferably approximately 99 percent by weight.

Methods of dissolving the polymers in a variety of solvents are known to those skilled in the art. One suitable method requires drying the starting polymers to a moisture level of approximately 2 weight percent in a vacuum oven at a temperature of approximately 100° C. to approximately 160° C. for approximately 10 to approximately 16 hours. Preferred conditions for dissolving the polymers comprise heating the mixture of polymer and solvent in a stainless steel reactor at a pressure of from approximately 2 to approximately 7 atmospheres for approximately 2 hours at a temperature of from approximately 25° to approximately 125° C. The resulting solution is preferably filtered to remove any undissolved polymer prior to being processed. Optionally, the two polymers may be individually dissolved in the solvent and subsequently mixed together in the desired proportions.

The solution may be prepared into films, fibers and molded articles by conventional techniques. Films may be readily prepared from the solution of the present invention by conventional casting processes known in the art. The solvent may be removed from the film by washing in a nonsolvent such as water or a $C_1$ to $C_4$ aliphatic alcohol, and drying at a low relative humidity and moderate temperature of less than approximately 140° C.

Fibers may be prepared from the polymeric solution of the invention by wet spinning methods known in the art; see for instance, commonly assigned U.S. Pat. No. 3,441,640 herein incorporated by reference in its entirety. Commonly assigned U.S. Pat. No. 3,851,025 herein incorporated by reference in its entirety, which described a process for preparing a hollow polybenzimidazole filaments may be utilized to prepare filaments from the resin solution to the present invention. The fibers are useful in the production of fire retardant fabrics. Preferably, the spinning solution will contain from approximately 28 weight percent of polymer solids, and exhibit a viscosity of from approximately 1,000 to approximately 3,000 poise measured at a temperature of 25° C. and a shear rate of approximately 1.0 rpm.

The filtered, stable resin solution at a temperature of approximately 70° to approximately 150° C., is extruded through a plurality of extrusion orifices, e.g., from 50 to 300 orifices. These exturision orifices are generally in the form of a spinneret having from approximately 50 to approximately 100 holes. Typically, the orifices utilized in the process of the present invention have a diameter of approximately 20 to approximately 200 microns, and preferably a diameter of from approximately 30 to approximately 50 microns. The face of the spinneret is heated from approximately 130° to approximately 150° C. during extrusion. The solution is extruded vertically downward into a gaseous atmosphere to produce fibers which are drawn, washed to remove residual solvent and collected.

One embodiment of the invention is a process for preparing a polybenzimidazole fiber from a stable solution of polybenzimidazole resin, the solution consisting of from approximately 10 to 35 weight percent of resin and from approximately 65 to approximately 90 weight percent of a suitable solvent, based on the total weight of the solution, the resin component consisting of from approximately 70 to approximately 95 weight percent of benzimidazole and from approximately 5 to approximately 30 weight percent of polysulfone, based on the total weight of resins present in the solution, by the steps of:

(a) preparing a stable solution of polybenzimidazole resin consisting of from approximately 10 to approximately 35 weight percent of resin and from approximately 65 to approximately 90 weight percent of a suitable solvent, based on the total weight of the solution, the resins consisting of from approximately 70 to approximately 95 weight percent of polybenzimidazole and from approximately 5 to approximately 30 weight percent of polysulfone, based on the total weight of resins present in the solution, wherein the solution is substantially free of organic salts;

(b) extruding a fiber from the solution under substantially moisture-free conditions;

(c) evaporating the solvent from the fiber;

(d) washing the fiber with a non-solvent; and (e) drying the fiber at a low temperature.

Typically, the spinning solution contains from approximately 20 to approximately 30 weight percent of resin and approximately 70 to approximately 80 weight percent of a suitable solvent, based on the total weight of the solution, wherein the solution is substantially free of organic salts. Preferably, the solution contains approximately 28 weight percent resin and approximately 72 weight percent of a suitable solvent, based on the total weight of the solution, wherein the solution is substantially free of organic salts.

Typically, the spinning solution contains from approximately 75 to approximately 85 weight percent of polybenzimidazole and approximately 15 to approximately 25 weight percent of polysulfone, based on the total weight of resins present in the solution. Preferably, the solution contains approximately 80 weight percent of polybenzimidazole and approximately 20 weight percent of polysulfone, based on the total weight of resins present in the solution.

During fabrication the spinning solution is extruded vertically downward into a gaseous atmosphere through a plurality of extrusion orifices having a diameter of approximately 20 to approximately 200 microns to form a plurality of fibers and simultaneously drawing the filaments, with an initial draw ratio of from approximately 2:1 to approximately 20:1. The fibers may be hot drawn at a temperature in the range of from approximately 350° to approximately 500° C. and a ratio of from approximately 1.5:1 to approximately 10:1 to produce fibers having a denier per filament of approximately 0.5 to approximately 25 and a tenacity of at least 2.5 grams per denier. After drying, the hot drawn filaments may be subject to sulfonation. Sulfonation is designed to stabilize to fiber against shrinkage. Generally, sulfonation requires contacting the filament with a solution of sulfuric acid, dring and heat treating at a temperature of from approximately 200° to approximately 500° C. and drawing at a ratio of from approximately 0.95:1 to approximately 1:1. There is also a substantial weight gain of the as-spun fiber upon sulfonation. The fiber can gain an additional 20 percent weight by sulfonation. This weight increase in sulfonation components rather than polybenzimidazole is economical, and provides a fiber which has enhanced mechanical properties.

Molded articles may be prepared from the solution of the invention by first precipitating or atomizing particles using a non-solvent such as water or alcohol. The particles may be consolidated into densified shaped articles at temperatures of up to approximately 800° C. and pressures of up to approximately 60 ksi. A solid filler and/or reinforcement agent in the amount of approximately 1 to approximately 40 weight percent may be added to the molded article if desirable. Representative fibers which serve as reinforcement are selected from glass fibers, asbestos, grraphitic carbon fibers, amorphous carbon fibers, synthetic polymeric fibers, aluminum fibers, aluminum silica fibers, aluminum ixude fibers, titanium fibers, magnesium fibers, rock wool fiber, wollastonite fibers, steel fibers, etc. Representative fillers are selected from calcium silicate, silica, clays, talc, mica, polytetrafluoroethylene, graphite, alumina trihydrate, sodium aluminum carbonate, barium ferrite, etc.

Following are examples illustrative of preparing highly porous particles in accordance with the present invention. They are provided for purposes of exemplification only as should be appreciated from the foregoing discussion.

EXAMPLE 1

Solution Preparation

Several batches of dope containing no lithium chloride were prepared by dissolving PBI in DMAc at approximately 90° C. overnight and blending therewith a solution of PS dissolved in DMAc. Poly-2,2'-(m-phylene)-5,5'-bibenzimidazole exhibiting an intrinsic viscosity of 0.77 dl/gm, a glass transition temperature of approximately 435° C. manufactured by Hoechst Celanese Corporation, and a Udel ® P1700 polysulfone (PS) manufactured by Amoco Corporation were utilized to prepare the solutions. Solutions containing 21 weight percent of resin and 79 weight percent of a suitable solvent, i.e., DMAc, wherein the resin contained from 70 to 95 weight percent of PBI and from 5 to 30 weight percent of PS were prepared for stability evaluation. The two solutions mixed together well and appeared to be clear. The solution of 80 wt% PBI and 20 wt% PS appeared to be most stable after long periods of stagnation.

The viscosity of the solutions were evaluated. FIG. 1 illustrates the viscosities of dilute resin solutions containing 21 weight percent of resin and 79 weight percent of DMAc, based on the total weight of the solution, wherein the resin contains different weight percentages of PBI and PS at temperatures of 25°, 35°, 45° and 55° C. The viscosity of a solution containing 80 weight percent of PBI and 20 weight percent of PS, based on the total weight of the solution exhibited a viscosity of approximately 70 poise at a temperature of 25° C. and a shear rate of 1.0 rpm. The viscosities were measured according to ASTM No. D2857.

EXAMPLE 2

Preparation of As-spun Fibers

The stable spinning solution of 80 wt% PBI and 20 wt% PS (25.6 wt% polymer solids) prepared in Example 1 was utilized in a dry-spinning process to produce fibers. Generally, dry-spun fibers exhibited mechanical properties superior to that of wet-spun fibers. The solution at a temperature of approximately 70° C. was filtered and metered by a gear pump to a spinneret having 75 holes, and a takeup speed of approximately 200 meter/min. The solution was extruded vertically downward into a hot stream of circulating N, gas in a dry column approximately 6.6 meters long at a temperature of approximately 200° C. Fibers were formed when most of the DMAc was vaporized, and residual DMAc in the as-spun fiber was removed by washing with water. The properties of as-spun fibers, analyzed in accordance with ASTM No. D3822, are presented below in Table I for comparison.

TABLE I

| | Fiber Properties of As-spun 8020 PBI/PS Fiber | | | |
|---|---|---|---|---|
| Sample | Denier, (dpf) | Init. Mod., (gm/d) | Tenacity, (gm/d) | Elong., (%) |
| PBI/PS LiCl | 4.46 | 43.5 | 1.417 | 82.5 |
| PBI/PS no LiCl | 5.82 | 32.2 | 1.374 | 106.0 | g/d × 8.83 = cN/tex

As-spun fibers containing no lithium chloride exhibit enhanced elongation without significant sacrifice of denier, modulus and tenacity.

EXAMPLE 3

Hot Drawn Fibers

To improve fiber properties, the as-spun fibers prepared in Example 2 were hot-drawn by passing the dried fibers through a muffle furnace at a temperature of from approximately 380 to approximately 400° C. at a rate of approximately 1.5 meter/min. Skewed rolls before and after the muffle furnace accurately maintained the fibers at proper speeds. The spin-line tension caused the fibers to elongate, and the polymeric structure within the fibers was believed to be better oriented. The tensile properties of hot drawn PBI/PS fibers, and neat PBI fibers are presented below in Table II for comparison.

TABLE II

| | Tensile Properties of Hot Drawn Fibers | | | | |
|---|---|---|---|---|---|
| Sample | Denier, (dpf) | Draw Ratio | Init. Mod. (gm/d) | Tenacity, (gm/d) | Elong., (%) |
| PBI/PS (80/20) LiCl | 1.98 | 4.0 at 420° C. | 112.1 | 3.6 | 7.3 |
| PBI/PS (80/20) no LiCl | 1.00 | 4.5 at 420° C. | 134.1 | 4.84 | 5.9 |
| PBI Control no LiCl | 1.7 | 2.0 at 440° C. | 91.0 | 4.0 | 31.9 | g/d × 8.83 = cN/tex

EXAMPLE 4

Fiber Stabilization

The hot drawn fibers prepared similar to those of Example 3, but with different draw ratios, were stabilized utilizing the sulfonation process described hereinbefore. The tensile properties of hot drawn and stabilized fibers are presented below in Table III for comparison.

TABLE III

| | Tensile Properties of Hot Drawn and Stabilized Fibers | | | |
|---|---|---|---|---|
| Sample | LiCl | Init. Mod. (g/d) | Tenacity, (gpd) | Elong., (%) |
| PBI/PS 80/20 | no | 91.8 | 3.77 | 16.7 |
| PBI/PS 80/20 stabilized | no | 58.7 | 2.6 | 19.1 |
| PBI/PS 80/20 | yes | 108.6 | 2.96 | 3.63 |
| PBI/PS 80/20 stabilized | yes | 71.5 | 2.24 | 5.9 |
| PBI Control | yes | 45 | 2.7 | 30.0 |

TABLE III-continued

| | Tensile Properties of Hot Drawn and Stabilized Fibers | | | |
|---|---|---|---|---|
| Sample | LiCl | Init. Mod. (g/d) | Tenacity, (gpd) | Elong., (%) |
| Stabilized | | | | |

The elongation of a hot drawn fiber prepared from a solution substantially free of lithium chloride is improved over that of a fiber prepared from a solution containing lithium chloride.

EXAMPLE 5

Sulfur Content of Stabilized Fibers

The stabilized fibers of Example 4 were analyzed for sulfur and $SO_3H$ content, and the change in denier. The content of S and $SO_3H$ are presented below in Table 4 for comparison.

TABLE IV

| | Sulfur and $SO_3H$ Content in Hot Drawn, Sulfonated Fibers | | | |
|---|---|---|---|---|
| Sample | Sulfonated | S Cont* (%) | $SO_3H$ Cont+ (%) | Denier Change• (%) |
| PBI/PS 80/20 no LiCl | No | 1.75 | n.o. | n.o. |
| PBI/PS 80/20 no LiCl | Yes | 8.55 | 21.64 | 21.85 |
| PBI/PS 80/20 LiCl | No | 1.53 | n.o. | n.o. |
| PBI/PS 80/20 LiCl | Yes | 6.38 | 16.15 | 16.55 |

*S content was measured by an analytical method.
+$SO_3$ content was calculated by assuming that all S becomes $SO_3H$.
•Average denier change was calculated based on the change of fiber denier before and after sulfonation.

Figure 2:
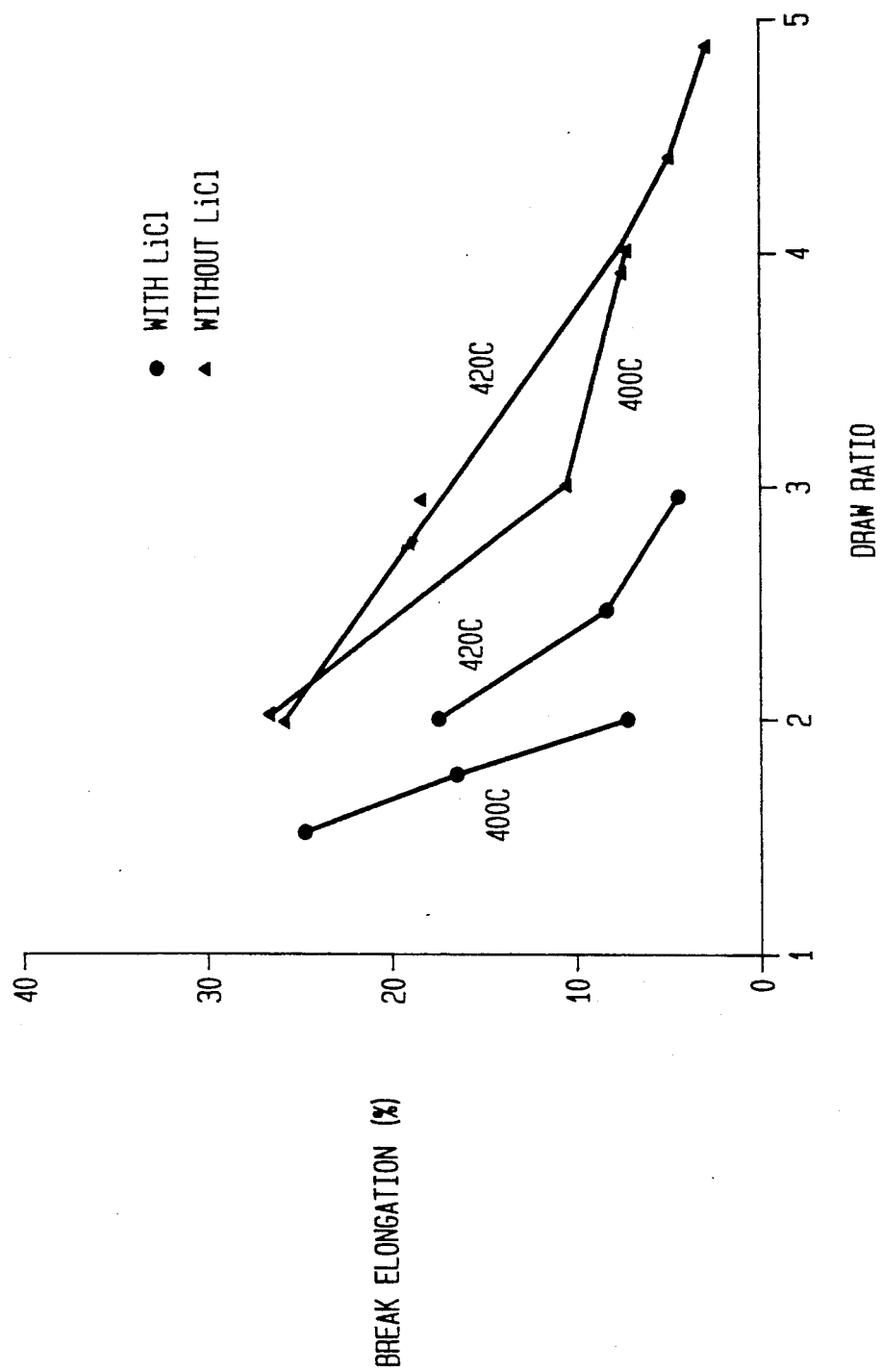
FIG. 2 is a graph of the break elongation of dry-spun fibers prepared from a stable solution containing 80 weight percent polybenzimidazole and 20 weight percent polysulfone.

FIG. 2 illustrates the break elongation of dry-spun fibers prepared from a solution containing 80 weight percent of polybenzimidazole and 20 weight percent of polysulfone with and without lithium chloride and drawn at 400° and 420° C. The draw ratio of fiber prepared from a solution containing no lithium chloride show a significant improvement over fibers prepared from a solution containing lithium chloride at the same break elongation.

Figure 3:
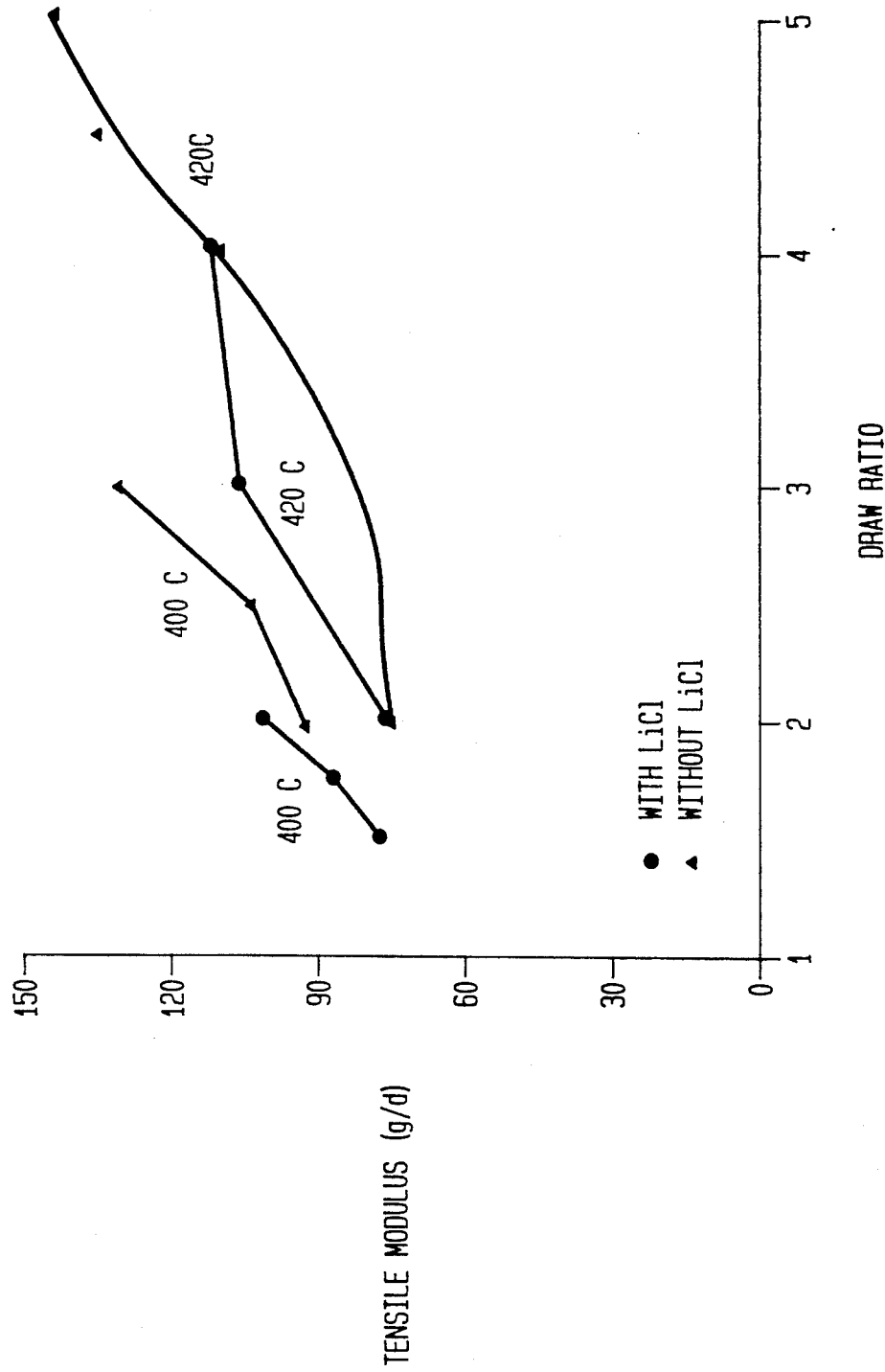
FIG. 3 is a graph of the tensile modulus of dry-spun fibers prepared from a stable solution containing 80 weight percent polybenzimidazole and 20 weight percent polysulfone.

FIG. 3 illustrates the tensile modulus of dry-spun fibers prepared from a solution containing 80 weight percent of polybenzimidazole and 20 weight percent of polysulfone with and without lithium chloride and drawn at 400° and 420° C. The fiber prepared from a solution containing no lithium chloride exhibit greater tensile moduli at higher draw ratios.

Figure 4:
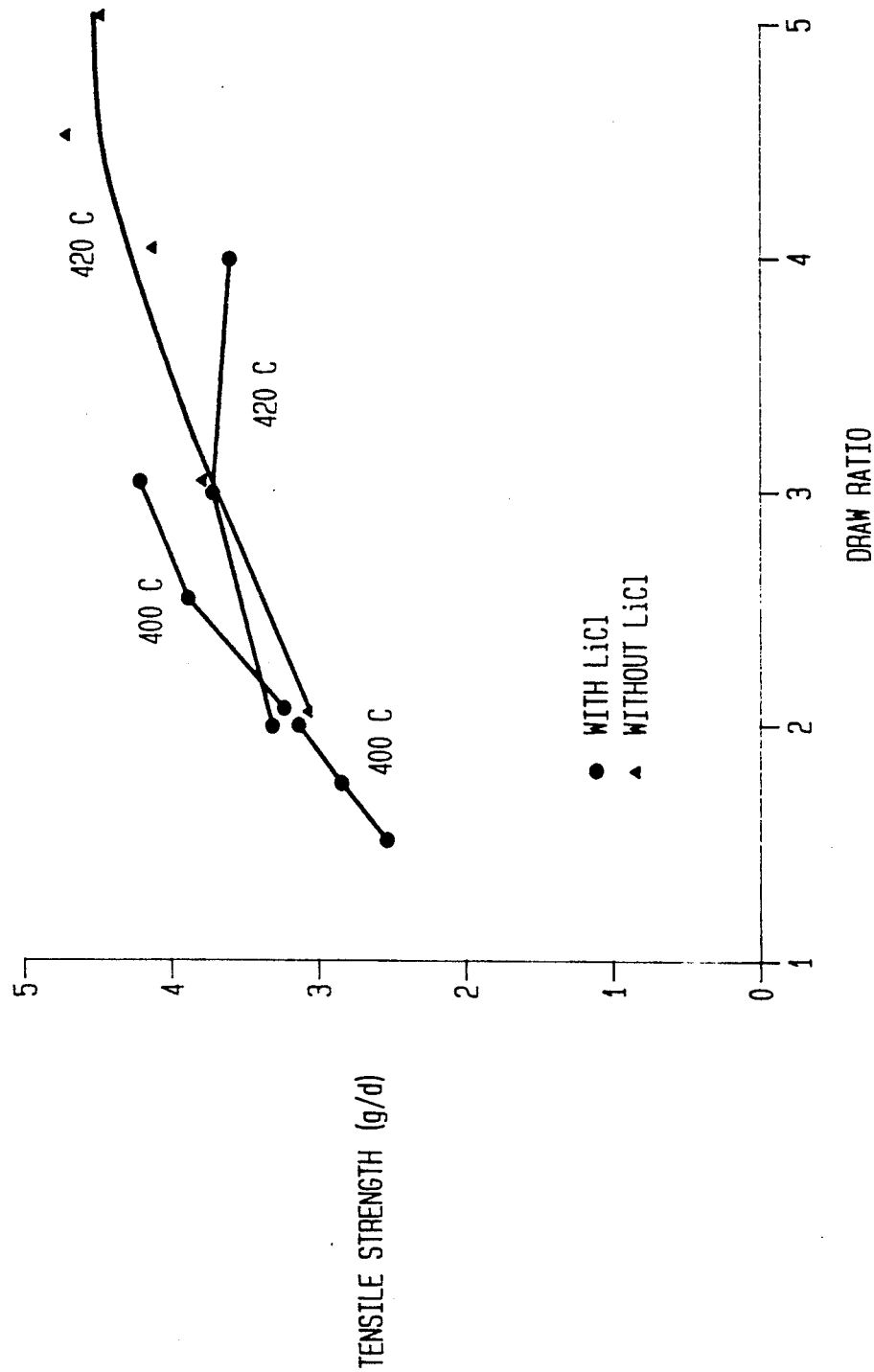
FIG. 4 is a graphical representation of the tensile strength of dry-spun fibers prepared from a stable solution containing 80 weight percent polybenzimidazole and 20 weight percent polysulfone.

FIG. 4 illustrates the tensile strength of dry-spun fibers prepared from a solution containing 80 weight percent of polybenzimidazole and 20 weight percent of polysulfone with and without lithium chloride and drawn at 400° and 420° C. The fibers prepared from a solution containing no lithium chloride exhibit greater tensile strength at higher draw ratios.

We claim:

1. A stable solution of polybenzimidazole resin consisting of from approximately 10 to approximately 35 weight percent of resin and from approximately 65 to approximately 90 weight percent of a suitable solvent, based on the total weight of the solution, the resin consisting of from approximately 70 to approximately 95 weight percent of polybenzimidazole and from approximately 5 to approximately 30 weight percent of polysulfone, based on the total weight of the resins present in the solution, wherein the solution is substantially free of organic salts.

2. The solution according to claim 1 wherein the polybenzimidazole is poly 2,2'-(m-phenylene)-5,5'-bibenzimidazole.

3. The solution according to claim 2 wherein the polysulfone is of the formula:

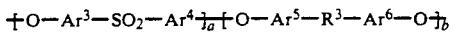

wherein $Ar^3$, $Ar^4$, $Ar^5$, and $Ar^6$ are aromatic moieties having from approximately 6 to approximately 18 carbon atoms, or aromatic moieties having the following formula:

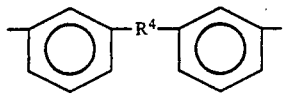

wherein $R^4$ represents $C(CH_3)$, $SO_2$, S, O, or mixtures thereof; $R_3$ represents a divalent aliphatic moiety containing up to 6 carbon atoms, or mixtures thereof; and a has the value greater than approximately 0.5 to approximately 1.0, b has the value of 0 or less than approximately 0.5, and the sum of a and b is equal to 1.0.

4. The solution according to claim 3 wherein the resins consist essentially of approximately 80 weight percent of polybenzimidazole and approximately 20 weight percent of polysulfone.

5. The solution according to claim 4 wherein the solution consist essentially of approximately 28 weight percent of resin and approximately 72 weight percent of solvent, based on the total weight of the solution.

6. The solution according to claim 1 wherein the solvent is selected from the group consisting of N,N'-dimethlyacetamide, N,N'-dimethylformamide, dimethylsulfoxide, and N-methyl-2-pyrrolidone, formic acid, acetic acid, sulfuric acid, polyphosphoric acid, and methanesulfonic acid.

7. The solution according to claim 5 wherein the solvent (1 N,N'-dimethylacetamide.

8. The solution according to claim 5 having a viscosity of approximately 1,000 to approximately 3,000 poise at a temperature of approximately 25° C. and a shear rate of approximately 1.0 rpm.

9. The solution according to claim 7 useful for the production of films, fibers and molded articles.

10. A fiber prepared from a stable solution of polybenzimidazole resin consisting of from approximately 5 to approximately 30 weight percent of the resin and from approximately 70 to approximately 95 weight percent of a suitable solvent, based on the total weight of the solution, the resin component consisting essentially of from approximately 70 to approximately 95 weight percent of polybenzimidazole resin and from approximately 5 to approximately 30 weight percent of polysulfone resin, based on the total weight of resins present in the solution, wherein the resins solution is substantially free of organic salts, by the process of:

(a) preparing a stable solution of polybenzimidazole resin consisting of from approximately 10 to approximately 35 weight percent of resin and from approximately 65 to approximately 90 weight percent of a suitable solvent, based on the total weight of the solution, the resin consisting of from approximately 70 to approximately 95 weight percent of polybenzimidazole and from approximately 5 to approximately 30 weight percent of polysulfone, based on the total weight of resins present in the solution, wherein the solution is substantially free of organic salts;

(b) extruding a fiber from the solution under substantially moisture-free conditions;

(c) evaporating the solvent from the fiber;

(d) washing the fiber with a non-solvent; and (e) drying the fiber at a low temperature wherein the fiber exhibits enhanced elongation and sulfur weight gain.

11. The fiber according to claim 10 wherein the polybenzimidazole is poly-2,2'-(m-phenylene)-5,5'-bibenzimidazole.

12. The fiber according to claim 11 wherein the polysulfone is of the formula:

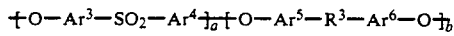

wherein $Ar^3$, $Ar^4$, $Ar^5$, and $Ar^6$ are aromatic moieties having from approximately 6 to approximately 18 carbon atoms, or aromatic moieties having the following formula:

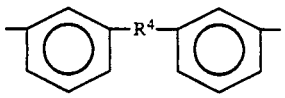

wherein $R^4$ represents $C(CH_3)$, $SO_2$, S, O, or mixtures thereof; $R^3$ represents a divalent aliphatic moiety containing up to 6 carbon atoms, or mixtures thereof; and a has the value greater than approximately 0.5 to approximately 1.0, b has the value of 0 or less than approximately 0.5, and the sum of a and b is equal to 1.0.

13. The fiber according to claim 12 wherein the resins consist essentially of approximately 80 weight percent of polybenzimidazole and approximately 20 weight percent of polysulfone.

14. The fiber according to claim 13 wherein the solution consist essentially of approximately 28 weight percent of resin and approximately 72 weight percent of solvent.

15. The fiber according to claim 14 wherein the solvent is selected from the group consisting of N,N'-dimethlyacetamide, N,N'-dimethylformamide, dimethylsulfoxide, and N methyl-2-pyrrolidone, formic acid, acetic acid, sulfuric acid, polyphosphoric acid, and methanesulfonic acid.

16. The fiber according to claim 15 which is contacted with a sulfonating agent and heat treated at a temperature of approximately 200° to approximately 500° C.

17. The fiber according to claim 10 wherein the non-solvent is selected from water and $C_1$ to $C_4$ aliphatic alcohols.

18. The fiber according to claim 16 wherein the as-spun fiber is draw after extrusion at a draw ratio of approximately 2:1 to approximately 20:1.

19. The fiber according to claim 18 exhibiting an elongation of at least approximately 85 percent.

20. The fiber according to claim 19 which is hot-drawn at a draw ratio of approximately 1.5:1.0 to approximately 10:1 and at a temperature of from approximately 350° to approximately 500° C.

* * * * *